Sept. 13, 1938.  W. M. HARKS  2,130,085
OIL SUPPLY FITTING
Filed Feb. 11, 1936  2 Sheets-Sheet 1
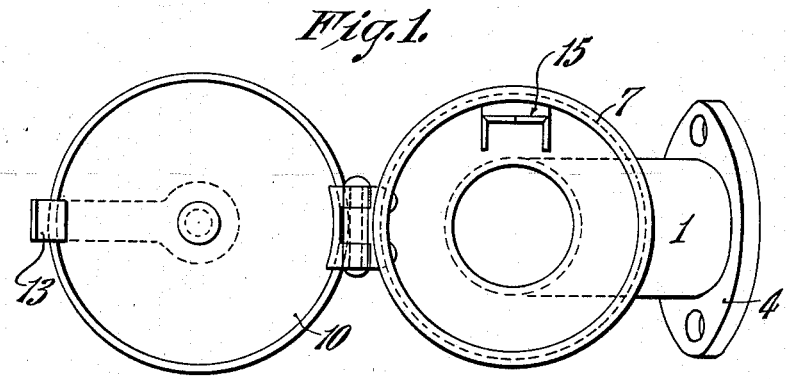
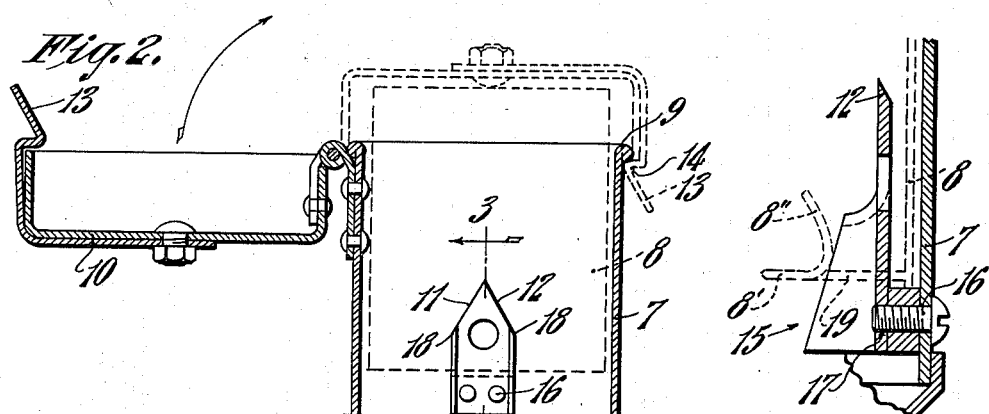
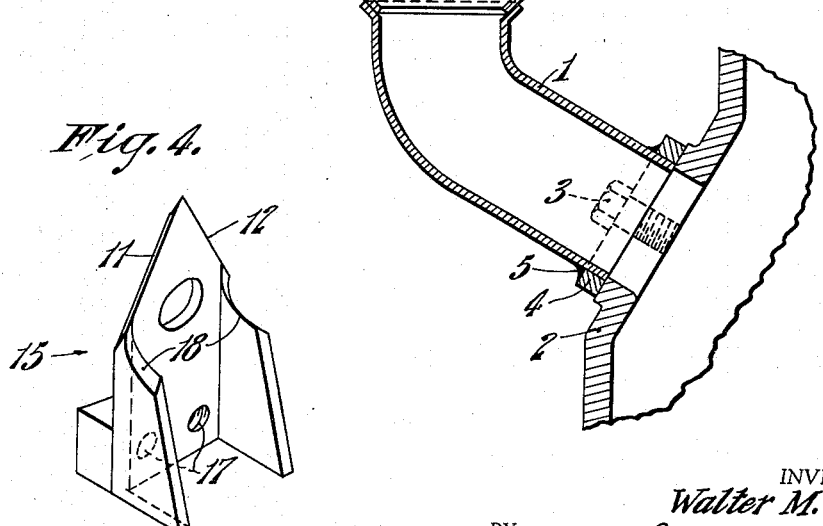
INVENTOR,
Walter M. Harks,
BY Harry W. Bowen,
ATTORNEY.

Sept. 13, 1938. W. M. HARKS 2,130,085
OIL SUPPLY FITTING
Filed Feb. 11, 1936 2 Sheets-Sheet 2
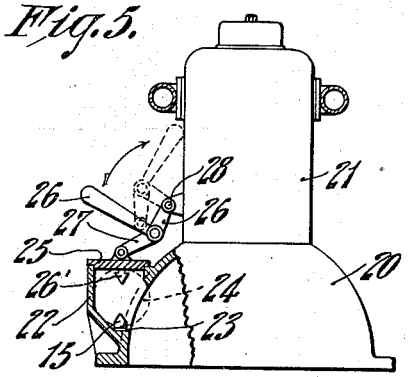
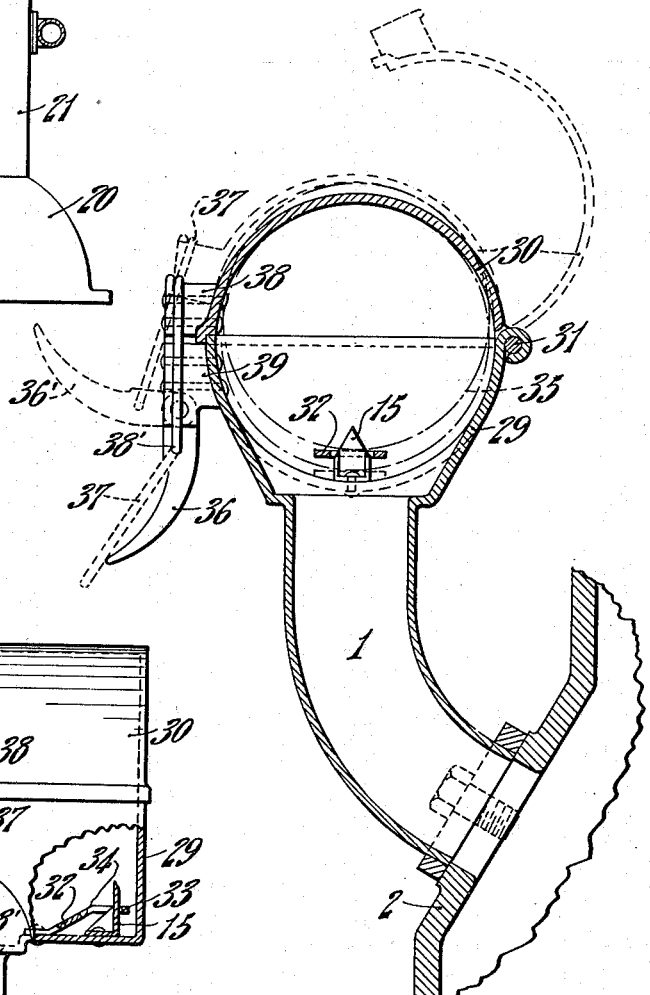
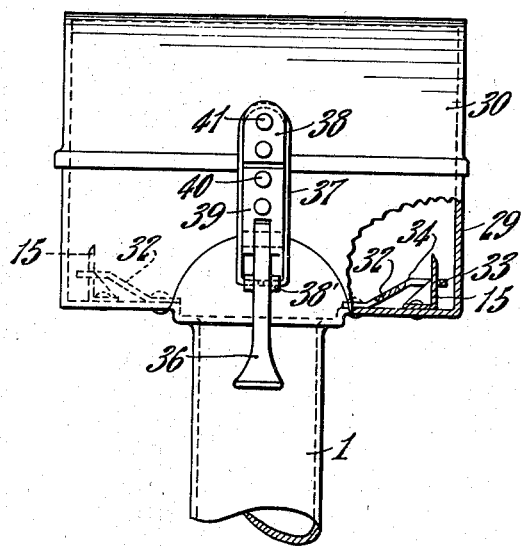
INVENTOR,
Walter M. Harks,
BY
Harry W. Bowen,
ATTORNEY.

Patented Sept. 13, 1938

2,130,085

UNITED STATES PATENT OFFICE 2,130,085

OIL SUPPLY FITTING

Walter M. Harks, Springfield, Mass.

Application February 11, 1936, Serial No. 63,460

1 Claim. (Cl. 184—105)

This invention relates to improvements in an oil supply fitting, and is particularly adapted for connection to the crank case of a motor vehicle.

An object of the invention is to provide a convenient structure which will permit the contents of a sealed can of oil to be placed in the device and then punctured, when the can is inserted and allow it to remain in this position, until all of the oil has thoroughly drained from the sealed can; thus effectually insuring the use and saving of all of the oil in the can. The device might be termed a crank case adapter.

The construction is so arranged, that, after the sealed can is inserted and punctured, the car may be driven, without removing the can, as the heat from the engine will serve to heat the oil in the can, so that all of it will drip out of the can into the crank case.

It has been found, from actual experience, that when a sealed can of oil is punctured and its contents emptied into a dispensing device, usually with a long spout, and from this dispensing device into the crank case, that there is a large loss of oil, due to the fact that the can is not thoroughly drained, as well as the dispensing device.

In fact, it has been found that at least a pint of oil is wasted, when the contents of 2 dozen cans are emptied in this way.

Another important feature is that the motorist may purchase oil at a reduced price by buying a large number of cans at one time, which may be taken in his car on long trips, and, thoroughly emptied, as required, without any loss of time, or damage, to his car, for lack of oil.

An object of the invention is to so construct said device that it may be readily attached to the usual breather pipe connection of the crank case, or other parts of the engine.

A further object of the invention is to provide such a device with means for automatically removing the emptied oil can from the device, after the oil has thoroughly drained out of the can; also, it is within the scope of my invention that the device may be formed as a part of the crank case structure, as will be fully described.

Referring to the drawings:

Fig. 1 is a top plan view of the device, removed from the engine, showing the cover open and the can-puncturing knife.

Fig. 2 is a sectional view on a plane through the axis of the device, illustrating, in dotted lines, an oil can in place and the end punctured by the knife.

Fig. 3 is a sectional view on the line 3—3 of Fig. 2, showing the knife construction.

Fig. 4 is a perspective view of the knife on a larger scale, removed from the device.

Fig. 5 is a view of a modification, illustrating the invention when forming a part of the crank case structure.

Fig. 6 is a further modification, in which the oil can is placed in a horizontal position, with means for forcing the same downward, for puncturing the can, and at the same time, moving the cover into a closed position, and Fig. 7 is a side view of Fig. 6, partially in section, looking from the left, showing the can-puncturing knives, and toggle joint closure device for the cover.

Referring to the drawings in detail:—

1 designates a pipe member, formed with a suitable curvature, that is attached to the crank case 2, by means of the machine screws 3, passing through the flange 4, that may be attached to the pipe 1, by brazing, or other suitable means, indicated at 5. Located at the upper end of the pipe 1, by means of the cone-shaped member 6, is a cylindrical member 7, the dimensions of which are such, that, when a sealed can of oil, indicated in dotted lines at 8, is inserted, it will project above the upper edge 9. It is then forced downward onto the knife for forming a rectangular opening in the bottom. The cover, indicated at 10, is now moved over into the dotted line position, and it will engage the top of the can 8 and hold it in place on the knife edges 11, 12, and 18. When the can 8 is inserted and the operator forces it downward onto these knife edges, the bottom of the can having the opening 19, the oil will flow therefrom downward into the pipe 1, into the crank case 2. The cover 10 is provided with a latch 13 having a shoulder portion 14, which snaps under the upper edge 9 of the member 7. The knife 15, shown in detail in Fig. 4, is secured to the can-receiving receptacle 7, by means of the machine screws 16, which engage the threaded openings 17. The knife 15 is formed with the curved edges 18 that are spaced from each other, so as to provide a large rectangular-shaped opening 19, for air to flow into the can 8, as well as for the oil to escape. In Fig. 3, the bottom of the can 8, indicated at 8', is shown formed with an opening 19, caused by the bottom being bent upwards, as shown at 8''.

It is to be understood that the pipe 1 is attached to the crank case 2 by removing the breather pipe and attaching the same, which carries the can-receiving receptacle 7 thereto.

Referring to Fig. 5, a crank case is indicated at 20 and one of the cylinders of the engine at 21. Formed as a part of the crank case 20 is an extension 22, having the knife 15 located on the shoulder 23. The can, containing the oil to be emptied, is indicated in a horizontal position, in dotted lines at 24. 25 designates a cover having an arrow-shaped can-perforating member 26'. This member also serves the purpose of removing the can 24, after the same has been thoroughly emptied of its contents. An operating handle 26 is connected to the toggle links 27 that are connection to the cover 25 and to the engine casing at 28. When the handle 26 is thrown upward, as indicated by the arrow, the cover 25 and the can 24, by means of the member 26', will be removed, and when it is forced down into the full line position, the cover will be in place, and the can forced down onto the knife 15. By placing the can 24 in horizontal position, all of the oil will be readily drained therefrom, by reason of the curved sides of the can. Referring to Figs. 7 and 8, which are a further modification, the pipe 1 is shown connected to the crank case 2, and its upper end is formed with the curved-shaped member 29, to which the cover 30 is hinged, as indicated at 31. Secured in the bottom portion of the member 29 are two of the knives 15, shown in detail in Fig. 4. Also, secured to the bottom of the member 29, are two spring members 32, the free ends 33 of which is formed with a slot 34, in which the knife 15 is located. The purpose of these springs is to automatically move the empty oil can 35 upward, when the cover 30 is unlatched. This cover is retained in its closing position by means of the lever 36 to which is pivotally connected the link 37, at the point 38'. This link passes upward over the upper end of the block 38, which is secured to the cover 30. When the lever 36 is moved to the full line position, the cover 30 is moved downward forcing the can 35 onto the knives 15, and, when the lever 36 is moved upwards into the dotted line position, the cover is released and the springs 32 operate to move the emptied oil can upward away from the knives 15, whereby the operator may then remove the same from the member 29. 39 designates a block secured to the member 29, by means of the rivets 40 and the block 38 is secured to the cover 30 by the rivets 41.

What I claim is:—

In an oil adapter device for the purpose described, a member for receiving a filled and sealed can of lubricating oil when placed in a horizontal position, spaced knife members for forming oil discharge openings in the lower portion of the filled can, a cover for the can-receiving member, cam latch means for opening and closing the cover and for forcing the can onto the knives, said cover being in engagement with the can for retaining the can on the knife members, flat strip springs through which said knives project for automatically removing the empty can from the knives when the cover is opened.

WALTER M. HARKS.